United States Patent Office 3,059,032
Patented Oct. 16, 1962

3,059,032
PRODUCTION OF α-VINYL KETONES
Henri Marie Normant, Paris, France, assignor to Societe des Usines Chimiques Rhone-Poulenc, Paris, France, a corporation of France
No Drawing. Filed Aug. 11, 1958, Ser. No. 754,124
Claims priority, application France Oct. 30, 1957
4 Claims. (Cl. 260—590)

The present invention concerns a new process for the preparation of α-vinyl ketones, which makes use of vinyl magnesium derivatives. (The term "α-vinyl ketone" is used in this specification to denote both vinyl and substituted vinyl ketones of formula RR'C=CR".CO.R''', where R, R', R" and R''' have the meanings given below.)

The vinyl magnesium derivatives, which are compounds which have until recently been practically unobtainable, may now be very conveniently prepared by using as reaction media tetrahydrofuran and tetrahydropyran compounds as described in French Patent No. 1,137,255. The solutions of vinyl magnesium derivatives obtained by this method have made possible new industrial syntheses, some of which have simply involved the use of the reactants normally employed in reactions with Grignard's magnesium compounds.

However, it has not been possible in practice to use the vinyl magnesium compounds in conjunction with any of the conventional reactants, such as acid chlorides, nitriles and substituted amides, in the preparation of vinyl ketones. With acid chlorides, a considerable catalyzed action of the magnesium chloride formed on the solvent is observed at room temperature. For example, when tetrahydrofuran is employed as the reaction medium, a 4-chlorobutanol ester is mainly obtained, and an α-vinyl ketone is not formed or is obtained only in a small quantity. The same effect is observed with tetrahydropyran, which is converted into a 5-chloropentanol ester.

With aliphatic and aromatic nitriles and under the usual operating conditions, high molecular condensation products are obtained, which are difficult to distill and purify.

Finally, with N-disubstituted amides vinyl magnesium compounds give, not α-vinyl ketones, but unsaturated amides.

In order to circumvent this difficulty, two indirect methods of preparing α-vinyl ketones have been developed (H. Normant, Bull. Soc. Chim. France, 1957, page 429), one of which starts with α:β-dihalogenated ethers, and the other with iminochlorides. However, the yields obtained are rather low and the processes are lengthy and delicate.

It has now been discovered that it is possible to obtain α-vinyl ketones directly in good yields by reacting a vinyl magnesium compound with an acid anhydride in solution in a solvent of the tetrahydrofuran or tetrahydropyran type.

According to this invention therefore α-vinyl ketones are made by a process which comprises effecting reaction between an acid anhydride and a vinyl magnesium compound of formula RR'C=CR"MgX, where R, R' and R" are hydrogen or aliphatic, cycloaliphatic, aryl or aralkyl residues free from substituents capable of reacting under the conditions employed and X is chlorine or bromine, in a reaction medium comprising tetrahydrofuran, tetrahydropyran, or a homologue of tetrahydrofuran or tetrahydropyran.

The invention may be performed by adding a solution of the vinyl magnesium compound, prepared in accordance with the directions of French Patent No. 1,137,255, to an excess of acid anhydride in solution of one of the said solvents, the solution being cooled to a temperature between −20° and −70° C.

The reaction may be represented as follows:

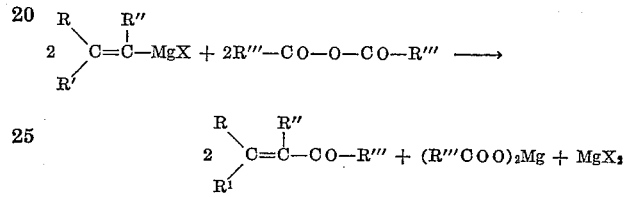

In these formulae, R, R', R" and X have the meanings given above, and R''' is an aliphatic, cycloaliphatic, aryl or aralkyl radical, in which any substituents are inert under the reaction conditions.

Among the magnesium derivatives which can be used in accordance with the present invention there may be mentioned in particular the magnesium derivatives of 1-bromopropene, 2-bromopropene and α-methyl-β-bromostyrene.

Among the acid anhydrides which may be used there may be mentioned by way of example the acid anhydrides of saturated fatty acids, such as acetic acid, butyric acid and heptanoic acid, the anhydrides of ethylenic acids especially α-ethylenically unsaturated acids such as crotonic acid, and the anhydrides of aromatic acids, especially mononuclear monocarboxylic acids such as benzoic acid.

The following example illustrates the invention without an any way limiting it.

*Example*

The procedure employed was to add a cooled solution of the vinyl magnesium compound in tetrahydrofuran to a cooled solution of the acid anhydride in the same solvent. The temperatures of the solutions were both about −30° C. and the reaction mixture was kept at about the same temperature until the reaction was complete. The results obtained with different vinyl magnesium compounds and acid anhydrides are summarised in the following table.

| Reactants employed | | Ketones obtained | B.P., °C./mm. pressure | $d_4^{20}$ | Yield, percent |
|---|---|---|---|---|---|
| Anhydride | Vinyl derivative | | | | |
| Acetic | $CH_3CH=C{\overset{H}{\underset{MgBr}{}}}$ | $CH_3-CO-CH=C{\overset{H}{\underset{CH_3}{}}}$ | 123/760 | 0.857 | 80 |
| Butyric | $CH_2=C{\overset{CH_3}{\underset{MgBr}{}}}$ | $CH_3(CH_2)_2CO-\underset{CH_3}{C}=CH_2$ | 42/20 | 0.852 | 66 |
| Heptanoic | $CH_3CH=C{\overset{H}{\underset{MgBr}{}}}$ | $CH_3(CH_2)_5CO-CH=C{\overset{H}{\underset{CH_3}{}}}$ | 112/18 | 0.835 | 70 |
| Acetic | $\underset{C_6H_5}{\overset{CH_3}{}}C=C{\overset{H}{\underset{MgBr}{}}}$ | $CH_3CO-CH=C{\overset{CH_3}{\underset{C_6H_5}{}}}$ | 130/12 | 0.997 | 50 |
| Benzoic | $\underset{C_6H_5}{\overset{CH_3}{}}C=C{\overset{H}{\underset{MgBr}{}}}$ | $C_6H_5CO-CH=C{\overset{CH_3}{\underset{C_6H_5}{}}}$ | 170/1 | 1.087 | 58 |
| Crotonic | $CH_3-CH=C{\overset{H}{\underset{MgBr}{}}}$ | $\begin{array}{c}CH_3-CH=CH\\ CH_3-CH=CH\end{array}\!\!\!\!\!\!\!CO$ | 72-74/25 | | 45 |

I claim:

1. Process for the production of α-vinyl ketones, which comprises reacting at a temperature of −70° to −20° C. an acid anhydride selected from the class consisting of the anhydrides of lower alkanoic acids, lower alkenoic acids, and benzoic acid, and a vinyl magnesium compound of the formula RR′C=CR″MgX where R and R′ are selected from the class consisting of hydrogen atoms, lower alkyl radicals and phenyl radicals, R″ is selected from the class consisting of the hydrogen atom and lower alkyl radicals, and X is selected from the class consisting of chlorine and bromine, in a liquid reaction medium of a cyclic ether selected from the class consisting of tetrahydrofuran and tetrahydropyran.

2. A process according to claim 1, which comprises effecting reaction between the magnesium compound of 1-bromopropene and the acid anhydride.

3. A process according to claim 1, which comprises effecting reaction between the magnesium compound of 2-bromopropene and the acid anhydride.

4. A process according to claim 1, which comprises effecting reaction between the magnesium compound of α-methyl-β-bromostyrene and the acid anhydride.

References Cited in the file of this patent

UNITED STATES PATENTS 2,855,397    Ramsden    Oct. 7, 1958
2,873,275    Ramsden    Feb. 10, 1959

OTHER REFERENCES

Kroeger et al.: J. Am. Chem. Soc., vol. 58, pages 1861-3 (1936).

Newman et al.: J. Am. Chem. Soc., vol. 67, page 154 (1945).

(Copies of above Journals in Library.)